United States Patent
Wang et al.

(10) Patent No.: US 11,765,736 B2
(45) Date of Patent: Sep. 19, 2023

(54) FAST FEEDBACK FOR SIDELINK CHANNELS

(71) Applicant: QUALCOMM Incorporated, San Diego, CA (US)

(72) Inventors: Hua Wang, Basking Ridge, NJ (US); Sony Akkarakaran, Poway, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 17/322,080

(22) Filed: May 17, 2021

(65) Prior Publication Data

US 2021/0385853 A1 Dec. 9, 2021

Related U.S. Application Data

(60) Provisional application No. 63/036,326, filed on Jun. 8, 2020.

(51) Int. Cl.
*H04L 5/00* (2006.01)
*H04W 72/23* (2023.01)
*H04W 72/21* (2023.01)

(52) U.S. Cl.
CPC .......... *H04W 72/23* (2023.01); *H04L 5/0055* (2013.01); *H04W 72/21* (2023.01)

(58) Field of Classification Search
CPC ......... H04W 72/1289; H04W 72/0413; H04W 72/14; H04W 72/23; H04W 72/21; H04L 5/0055

See application file for complete search history.

(56) References Cited

U.S. PATENT DOCUMENTS 11,082,954 B2 * 8/2021 Huang ................ H04B 7/0456
2021/0067303 A1 * 3/2021 Taherzadeh Boroujeni ................
H04L 1/0026

(Continued)

OTHER PUBLICATIONS

Fujitsu, "Discussion on HARQ-ACK Feedback for NR-V2X," 3GPP TSG RAN WG1 #96, 3GPP Draft, R1-1901944 Discussion on HARQ-ACK Feedback for NR-V2X Final, 3rd Generation Partnership Project (3GPP), Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 15, 2019 (Feb. 15, 2019), pp. 1-8, XP051599638, Retrieved from http://www.3gpp.org/ftp/tsg%5Fran/WG1%5FRL1/TSGR1%5F96/Docs/R1%2D1901944%2Ezip.

(Continued)

*Primary Examiner* — Michael J Moore, Jr.
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE on a sidelink channel, an indicator of a state of the sidelink channel. Accordingly, the first UE may transmit, to a base station, a request for an additional resource for the sidelink channel, based at least in part on determining that the indicator of the state of the sidelink channel satisfies a condition. For example, the first UE may determine that a modulation and coding scheme (MCS) supported by a current resource for the sidelink channel is outside a range of MCSs granted by the base station. In some aspects, the request may include a negative-acknowledgement (NACK) signal, and the first UE may also transmit a scheduling request for transmitting the indicator of the state of the sidelink channel Numerous other aspects are provided.

30 Claims, 7 Drawing Sheets

(56) References Cited

U.S. PATENT DOCUMENTS

| | | | |
|---|---|---|---|
| 2021/0091837 A1* | 3/2021 | Taherzadeh Boroujeni | ............... H04L 5/0053 |
| 2021/0105126 A1* | 4/2021 | Yi | ............... H04W 72/1242 |
| 2021/0136731 A1* | 5/2021 | Li | ............... H04L 5/0053 |
| 2021/0144750 A1* | 5/2021 | Cao | ............... H04W 72/0453 |
| 2021/0306043 A1* | 9/2021 | Damnjanovic | ....... H04W 72/21 |
| 2021/0385853 A1* | 12/2021 | Wang | ............... H04W 72/0413 |
| 2021/0391907 A1* | 12/2021 | Wang | ............... H04B 7/0632 |
| 2022/0007388 A1* | 1/2022 | Lee | ............... H04W 80/02 |
| 2022/0095279 A1* | 3/2022 | Hwang | ............ H04W 72/0406 |
| 2022/0158753 A1* | 5/2022 | Hwang | ............... H04L 27/34 |
| 2022/0167312 A1* | 5/2022 | Lee | ............... H04L 1/1812 |
| 2022/0183030 A1* | 6/2022 | Lee | ............... H04W 72/1226 |
| 2022/0225143 A1* | 7/2022 | Sun | ............... H04W 24/10 |
| 2022/0287055 A1* | 9/2022 | Lee | ............... H04W 72/0406 |
| 2022/0304001 A1* | 9/2022 | Lee | ............... H04W 72/0446 |
| 2022/0312407 A1* | 9/2022 | Guthmann | ............ H04L 5/006 |
| 2022/0368503 A1* | 11/2022 | Sun | ............... H04L 1/1812 |
| 2022/0400498 A1* | 12/2022 | Lee | ............... H04W 72/1263 |

OTHER PUBLICATIONS

Huawei, et al., "Support for Sidelink Unicast, Groupcast and Broad Cast," 3GPP Draft, 3GPP TSG RAN WG1 Meeting #94bis, R1-1810137, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517552, pp. 1-9, Retrieved from http://www.3gpp.org/ftp/tsg%5Fran/WG1%5FRL1/TSGR1%5F94b/Docs/R1%2D1810137%2Ezip.

International Search Report and Written Opinion—PCT/US2021/032934—ISA/EPO—dated Sep. 29, 2021.

LG Electronics, "Discussion on NR Sidelink Resource Allocation for Mode 1," 3GPP TSG RAN WG1 #100bis, 3GPP Draft, R1-2001885, 3rd Generation Partnership Project (3GPP), Mobile Competence Centre, 650, Route Des Lucioles, F-06921 Sophia-Antipolis Cedex, France, vol. RAN WG1, No. E-Meeting, Apr. 20, 2020-Apr. 30, 2020, pp. 1-28, Apr. 11, 2020 (Apr. 11, 2020), XP051875321, Retrieved from https://ftp.3gpp.org/tsg_ran/WG1_RL1/TSGR1_100b_e/Docs/R1-2001885.zip.

* cited by examiner

FAST FEEDBACK FOR SIDELINK CHANNELS

CROSS-REFERENCE TO RELATED APPLICATION

This patent application claims priority to U.S. Provisional Patent Application No. 63/036,326, filed on Jun. 8, 2020, entitled "FAST FEEDBACK FOR SIDELINK CHANNELS," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for transmitting and receiving fast feedback for sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a second UE on a sidelink channel, an indicator of a state of the sidelink channel; and transmitting, to a base station, a request for an additional resource for the sidelink channel, based at least in part on determining that the indicator of the state of the sidelink channel satisfies a condition.

In some aspects, a method of wireless communication performed by a base station includes transmitting, to a UE, a grant of one or more resources for use on a sidelink channel; and receiving, from the UE, a request for an additional resource for the sidelink channel, based at least in part on transmitting the grant of the one or more resources.

In some aspects, a non-transitory computer-readable medium storing a set of instructions for wireless communication includes one or more instructions that, when executed by one or more processors of a first UE, cause the first UE to receive, from a second UE on a sidelink channel, an indicator of a state of the sidelink channel; and transmit, to a base station, a request for an additional resource for the sidelink channel, based at least in part on determining that the indicator of the state of the sidelink channel satisfies a condition.

In some aspects, a non-transitory computer-readable medium storing a set of instructions for wireless communication includes one or more instructions that, when executed by one or more processors of a base station, cause the base station to transmit, to a UE, a grant of one or more resources for use on a sidelink channel; and receive, from the UE, a request for an additional resource for the sidelink channel, based at least in part on transmitting the grant of the one or more resources.

In some aspects, a first UE for wireless communication includes a memory and one or more processors coupled to the memory, the memory and the one or more processors configured to receive, from a second UE on a sidelink channel, an indicator of a state of the sidelink channel; and transmit, to a base station, a request for an additional resource for the sidelink channel, based at least in part on determining that the indicator of the state of the sidelink channel satisfies a condition.

In some aspects, a base station for wireless communication includes a memory and one or more processors coupled to the memory, the memory and the one or more processors configured to transmit, to a UE, a grant of one or more resources for use on a sidelink channel; and receive, from the UE, a request for an additional resource for the sidelink channel, based at least in part on transmitting the grant of the one or more resources.

In some aspects, an apparatus for wireless communication includes means for receiving, from a UE on a sidelink channel, an indicator of a state of the sidelink channel; and means for transmitting, to a base station, a request for an additional resource for the sidelink channel, based at least in part on determining that the indicator of the state of the sidelink channel satisfies a condition.

In some aspects, an apparatus for wireless communication includes means for transmitting, to a UE, a grant of one or more resources for use on a sidelink channel; and means for receiving, from the UE, a request for an additional resource for the sidelink channel, based at least in part on transmitting the grant of the one or more resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
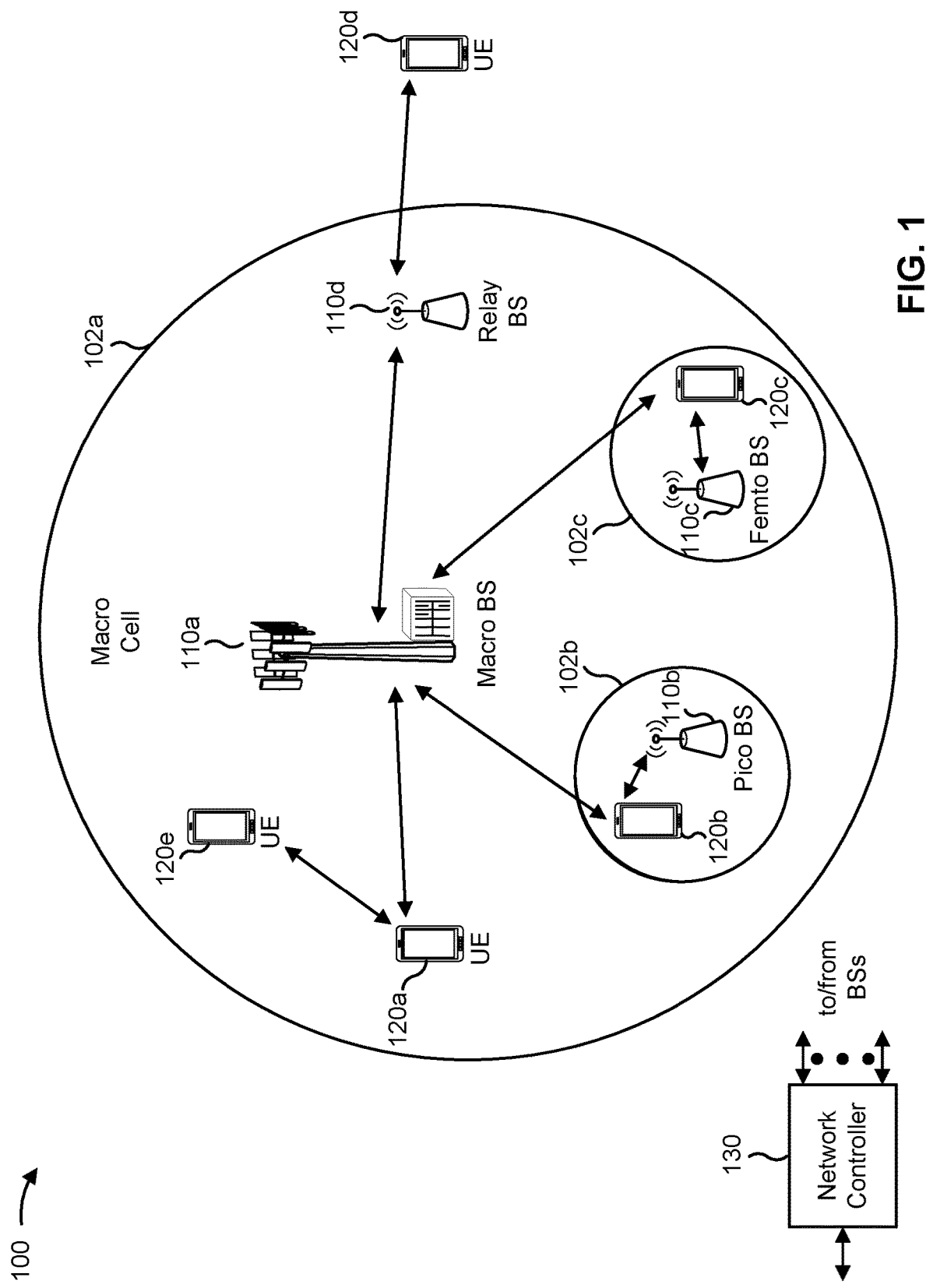
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
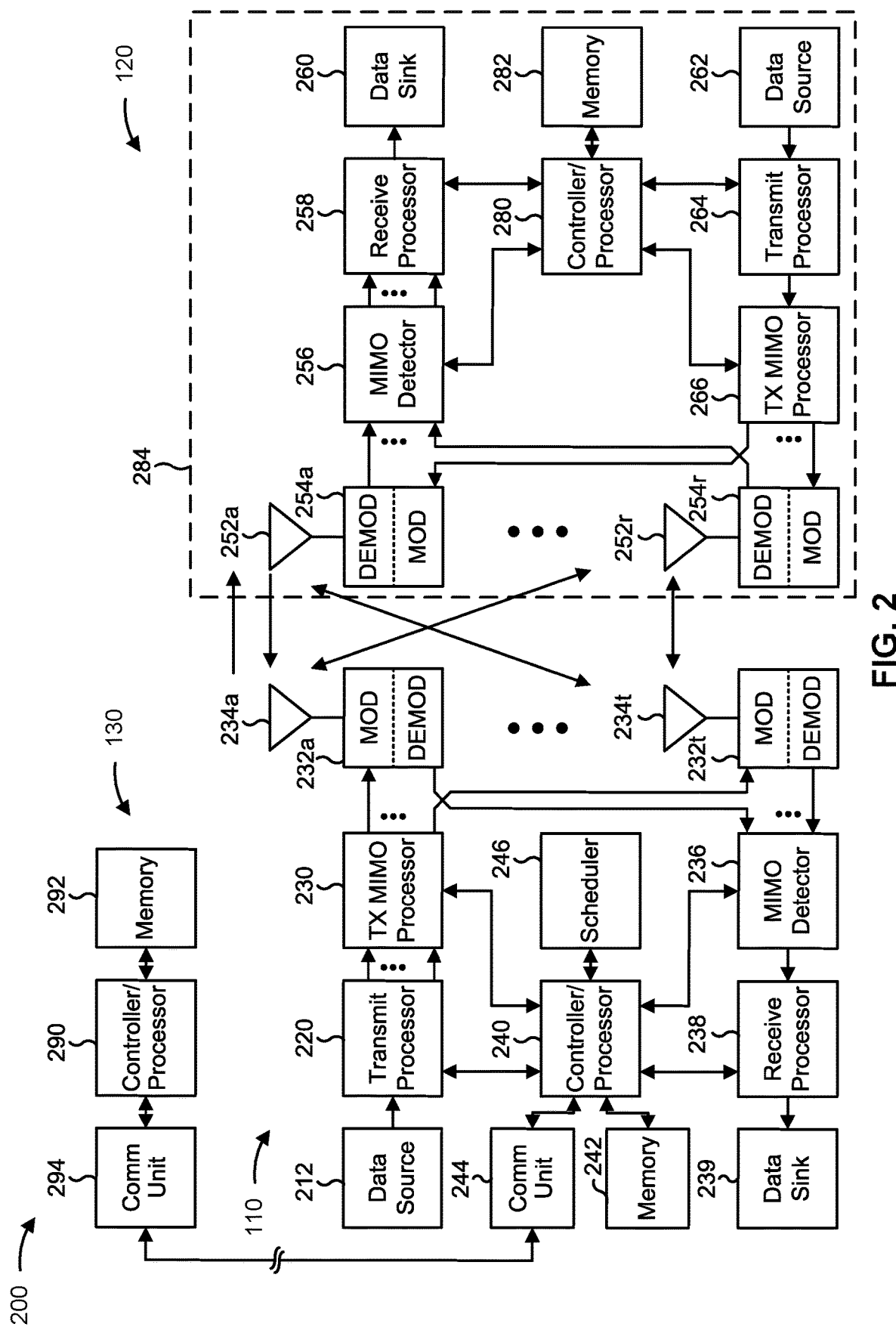
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5-7).

Controller/processor 240 of base station 110, controller/processor 280 of UE 120, and/or any other component(s) of FIG. 2 may perform one or more techniques associated with transmitting and receiving fast feedback for sidelink channels, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a first UE (e.g., the UE 120a) may include means for receiving, from a second UE (e.g., the UE 120e) on a sidelink channel, an indicator of a state of the sidelink channel; and/or means for transmitting, to a base station, a request for an additional resource for the sidelink channel, based at least in part on determining that the indicator of the state of the sidelink channel satisfies a condition. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or memory 282.

In some aspects, a base station (e.g., the base station 110) may include means for transmitting, to a UE (e.g., the UE 120a), a grant of one or more resources for use on a sidelink channel; and/or means for receiving, from the UE, a request for an additional resource for the sidelink channel, based at least in part on transmitting the grant of the one or more resources. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
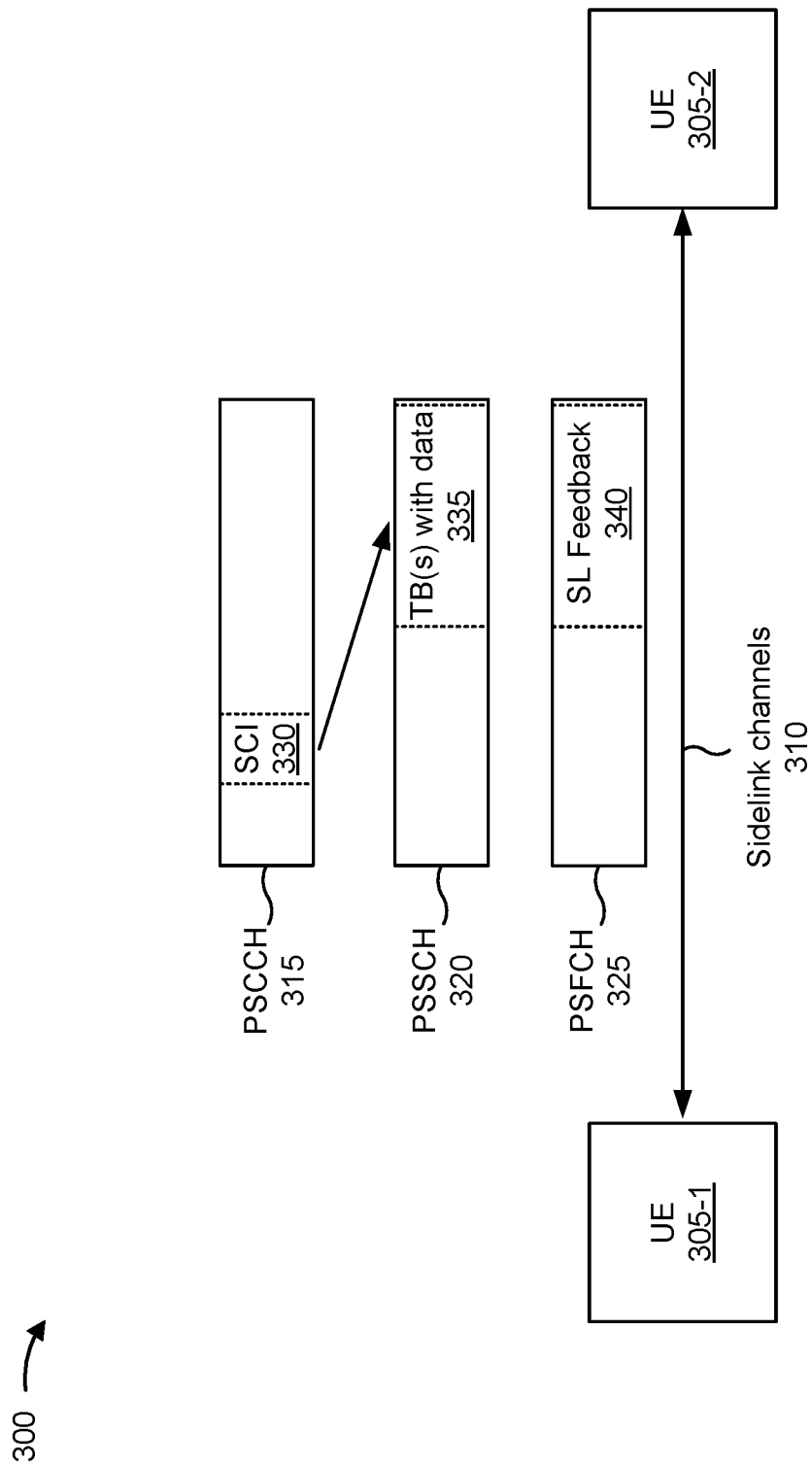
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative-acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
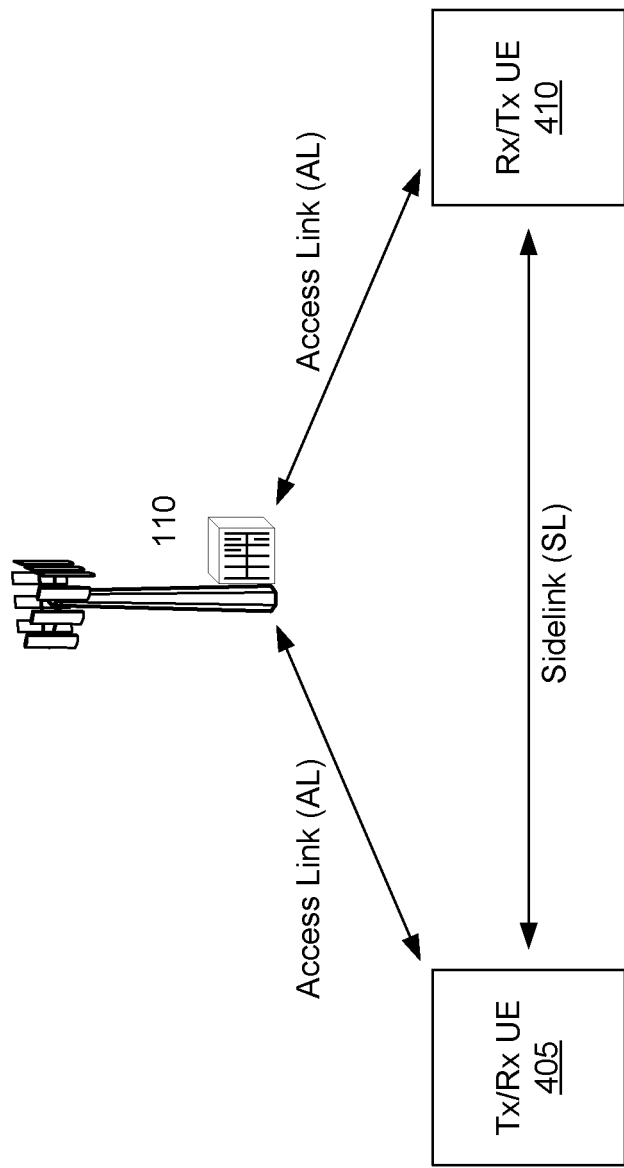
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In certain instances, a base station may allocate one or more resources to a UE for use on a sidelink channel. However, there may be a discrepancy between a state of the sidelink channel and the one or more resources allocated by the base station 110 for the sidelink channel. For example, a range of MCSs allocated by the base station may not allow for sidelink communications having reliability and/or quality satisfying a threshold, based at least in part on the state of the sidelink channel. Accordingly, the UE may transmit data, to at least one other UE, on the sidelink channel even though the at least one other UE is unlikely to receive and/or successfully decode the transmission. After the UE confirms that the transmission was not received (e.g., by receiving a NACK signal), the UE may report the failed transmission to the base station and request one or more new resources for the sidelink channel. However, this process wastes processing resources, as well as network overhead and battery power, and increases latency on the sidelink channel.

Techniques and apparatuses described herein allow a UE (e.g., Tx UE 305-1) to provide feedback to a base station (e.g., base station 110) based at least in part on a discrepancy between an indicator of a state of a sidelink channel (e.g. with another UE, such as Rx UE 305-2) and a resource allocated by the base station 110 for the sidelink channel. For example, a discrepancy may occur when a range of MCSs allocated by the base station 110 does not allow for sidelink communications having reliability and/or quality satisfying a threshold based at least in part on the state of the sidelink channel Techniques and apparatuses described herein allow the UE 305-1 to provide the feedback without transmitting data to at least one other UE (e.g., Rx UE 305-2) on the sidelink channel and waiting for confirmation that the at least one other UE did not receive the transmission. Accordingly, the UE 305-1 can conserve processing and network resources by not transmitting data that is unlikely to be received and/or successfully decoded. In some aspects, the UE 305-1 may also provide the feedback before a scheduled PUCCH slot in order to reduce latency between determining the discrepancy and requesting one or more new resources for the sidelink channel from the base station 110.

Figure 5:
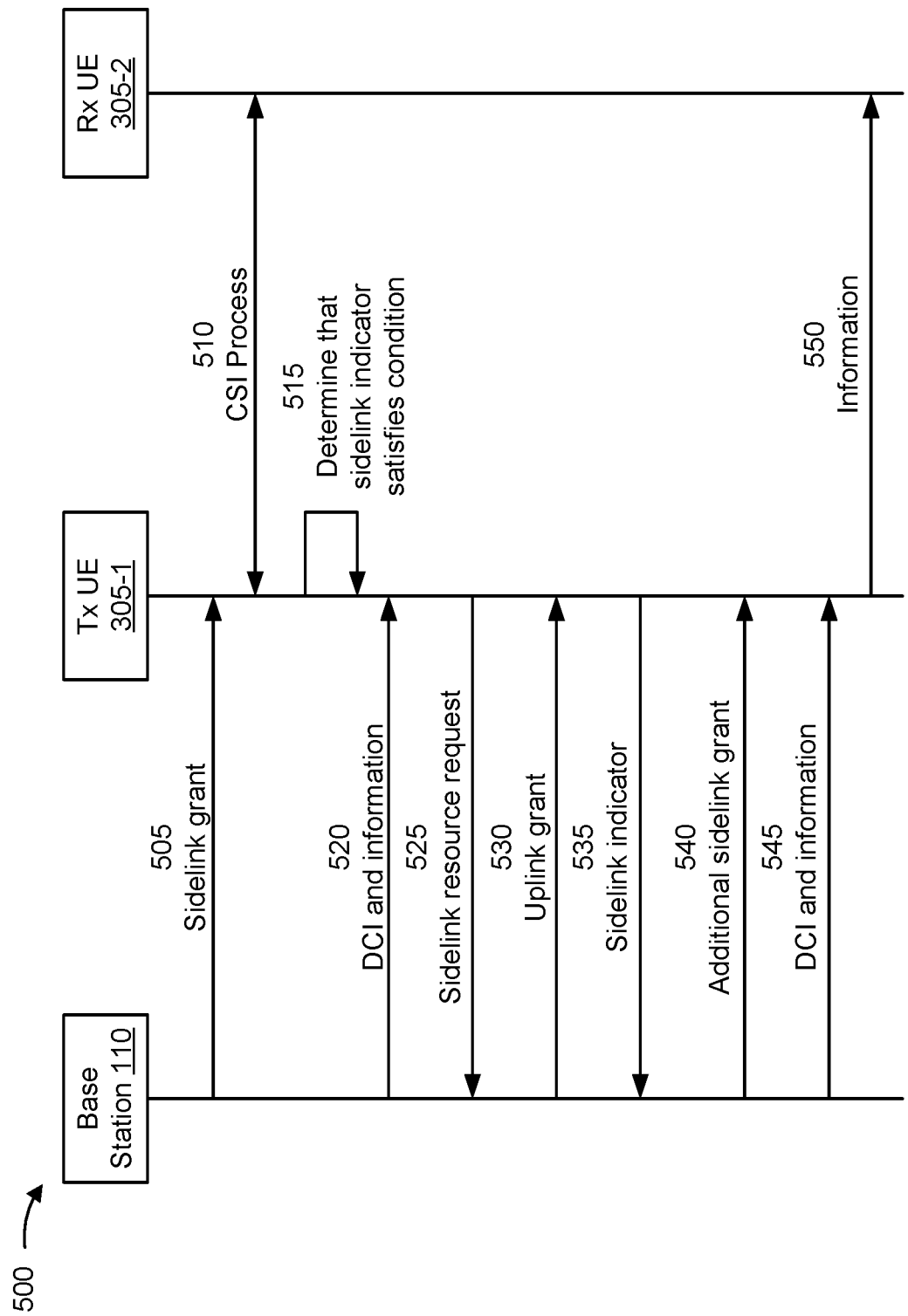
FIG. 5 is a diagram illustrating an example of fast feedback for a sidelink channel, in accordance with the present disclosure.

FIG. 5 is a diagram illustrating an example 500 of fast feedback for a sidelink channel, in accordance with the present disclosure. As shown in FIG. 5, example 500 includes a base station 110 communicating with a UE 305-1 (e.g., on a Uu interface), and a UE 305-2 receiving communications from the UE 305-1 on a sidelink channel (e.g., on a PC5 interface), such as sidelink channel(s) 310 of FIG. 3.

As shown in connection with reference number 505, the base station 110 may transmit, and the UE 305-1 may receive, a grant of one or more resources for use on the sidelink channel. For example, the base station 110 may transmit a configuration for the sidelink channel, such as an indicator of one or more slots for use on the sidelink channel, one or more sub-channels for use on the sidelink channel, a range of MCSs for use on the sidelink channel, and/or one or more other resources. In some aspects, the grant may include a radio resource configuration (RRC) message.

As shown in connection with reference number 510, the UE 305-1 and the UE 305-2 may perform a channel state indicator (CSI) process. For example, the UE 305-1 may transmit, and the UE 305-2 may receive, one or more CSI reference signals (CSI-RSs) for measurement. In some aspects, the UE 305-2 may transmit, and the UE 305-1 may receive, on the sidelink channel, an indicator of a state of the sidelink channel. For example, the indicator of the state of the sidelink channel may be based at least in part on measuring the CSI-RS(s) from the UE 305-1.

In some aspects, the indicator of the state of the sidelink channel may include a CSI report generated by the UE 305-2 (e.g., based at least in part on measuring the CSI-RS(s) from the UE 305-1, as described above). Additionally, or alternatively, the indicator of the state of the sidelink channel may include one or more CQIs associated with the sidelink channel and calculated by the UE 305-2 (e.g., based at least in part on measuring the CSI-RS(s) from the UE 305-1, as described above).

As shown in connection with reference number 515, the UE 305-1 may determine that the indicator of the state of the sidelink channel satisfies a condition. For example, the UE 305-1 may determine that an RSRP, a signal-to-interference-and-noise ratio (SINR), and/or another measure associated with the state of the sidelink channel, which may be included in or otherwise associated with the indicator of the state of the sidelink channel, satisfies a threshold. In some aspects, as shown in FIG. 5, the UE 305-1 may determine a discrepancy between a configuration for the sidelink channel (e.g., as described above with respect to reference number 505) and the indicator of the state of the sidelink channel.

Additionally, or alternatively, the UE 305-1 may determine that the indicator of the state of the sidelink channel satisfies the condition by determining that a current resource for the sidelink channel does not permit sidelink communications with reliability that satisfies a threshold. For example, the UE 305-1 may determine that the current resource does not permit sidelink communications with reliability that satisfies the threshold when an MCS supported by the current resource is outside a range of MCSs granted by the base station 110 (e.g., as described above in connection with reference number 505).

As shown in connection with reference number 520, the base station 110 may transmit, and the UE 305-1 may receive, downlink control information (DCI) for the sidelink channel. As further shown in connection with reference number 520, the base station 110 may transmit, and the UE 305-1 may receive, information intended for the UE 305-2 on the sidelink channel and scheduled by the DCI.

In some aspects, the UE 305-1 may refrain from transmitting the information to the UE 305-2. For example, the UE 305-1 may refrain from transmitting the information based at least in part on determining that the indicator of the state of the sidelink channel satisfies the condition (e.g., as described above in connection with reference number 515). Accordingly, the UE 305-1 may conserve network and processing resources (e.g., when the UE 305-2 is unlikely to receive and/or successfully decode the information on the sidelink channel).

As shown in connection with reference number 525, the UE 305-1 may transmit, and the base station 110 may receive, a request for an additional resource for the sidelink channel. For example, the UE 305-1 may transmit the request based at least in part on determining that the indicator of the state of the sidelink channel satisfies a condition (e.g., as described above in connection with reference number 515). In some aspects, the request transmitted by the UE 305-1 may serve as feedback, to the base station 110, associated with the sidelink channel.

In some aspects, the UE 305-1 may transmit the request before a scheduled PUCCH slot with the base station 110. For example, the UE 305-1 may transmit the request earlier in time than the scheduled PUCCH slot. Accordingly, the UE 305-1 may transmit the request as fast feedback, to the base station 110, associated with the sidelink channel. Accordingly, the UE 305-1 may reduce latency between determining that the indicator of the state of the sidelink channel satisfies the condition (e.g., as described above in connection with reference number 515) and receiving a grant of the additional resource for the sidelink channel (e.g., as described below in connection with reference number 540).

Accordingly, the base station 110 may receive, from the UE 305-1, the request for an additional resource for the sidelink channel, based at least in part on transmitting the grant of the one or more resources (e.g., as described above in connection with reference number 505). Additionally, or alternatively, the base station 110 may receive, from the UE 305-1, the request for an additional resource, based at least in part on transmitting information intended for the UE 305-2 (e.g., as described above in connection with reference number 520).

In some aspects, the request for an additional resource for the sidelink channel may include a NACK signal. For example, the UE 305-1 may transmit the NACK signal on a PUCCH. The UE 305-1 may transmit the NACK signal even though the UE 305-1 refrained from the transmitting the information scheduled by the DCI to UE 305-2 (e.g., as described above in connection with reference number 520). In some aspects, the base station 110 may further receive, from the UE 305-1 and with the NACK signal, an SR for transmitting an indicator of a state of the sidelink channel. For example, the UE 305-1 may transmit the SR in order to receive an uplink grant (e.g., as described below in connection with reference number 530).

As shown in connection with reference number 530, the base station 110 may transmit, and the UE 305-1 may receive, an uplink grant based at least in part on the request for the additional resource. For example, the base station 110 may transmit, to the UE 305-1, the uplink grant based at least in part on receiving an SR and/or a NACK signal (e.g., as described above in connection with reference number 525).

As shown in connection with reference number 535, the UE 305-1 may transmit, and the base station 110 may receive, the indicator of the state of the sidelink channel. For example, the UE 305-1 may transmit the indicator of the state of the sidelink channel using the uplink grant (e.g., as described above in connection with reference number 530). Additionally, or alternatively, the base station 110 may receive the indicator of the state of the sidelink channel on a PUCCH, a PUSCH, or a combination thereof. For example, the UE 305-1 may transmit the indicator of the state of the sidelink channel using an existing PUCCH, PUSCH, and/or other uplink channel in addition to or in lieu of transmitting the indicator of the state of the sidelink channel based at least in part on the uplink grant from the base station 110.

As shown in connection with reference number 540, the base station 110 may transmit, and the UE 305-1 may receive, a grant of the additional resource based at least in part on the indicator of the state of the sidelink channel. For example, the base station 110 may transmit a new configuration for the sidelink channel, such as an indicator of one or more new slots for use on the sidelink channel, one or more new sub-channels for use on the sidelink channel, a new range of MCSs for use on the sidelink channel, and/or one or more other new resources. In some aspects, the grant may include an RRC message.

In some aspects, the base station 110 may transmit the grant of the additional resource based at least in part on determining that the indicator of the state of the sidelink channel satisfies a condition. For example, the base station 110 may determine that the indicator of the state of the sidelink channel satisfies the condition by determining that the one or more resources for use on the sidelink channel do not permit sidelink communications with reliability that satisfies a threshold. For example, the base station 110 may determine that the one or more resources do not permit sidelink communications with reliability that satisfies the threshold when an MCS supported by the one or more resources is outside a range of MCSs indicated by the grant of the one or more resources (e.g., the grant described above in connection with reference number 505). Additionally, or alternatively, the base station 110 may receive an indication from the UE 305-1 that the UE 305-1 has determined a discrepancy between a configuration for the sidelink channel (e.g., as described above with respect to reference number 505) and the indicator of the state of the sidelink channel.

As shown in connection with reference number 545, the base station 110 may transmit, and the UE 305-1 may receive, DCI for the sidelink channel. As further shown in connection with reference number 545, the base station 110 may transmit, and the UE 305-1 may receive, information intended for the UE 305-2 on the sidelink channel and scheduled by the DCI. In some aspects, the DCI and/or the information transmitted by the base station 110 (e.g., in connection with reference number 545) may at least partially correspond to the DCI and/or the information transmitted earlier by the base station 110 (e.g., in connection with reference number 520). Accordingly, the base station 110 may re-transmit the DCI and/or the information for the UE 305-1 to forward to the UE 305-2 using the additional resource on the sidelink channel.

As shown in connection with reference number 550, the UE 305-1 may transmit, on the sidelink channel, the information to the UE 305-2. For example, the UE 305-1 may transmit the information based at least in part on receiving, from the base station 110, the grant of the additional resource (e.g., as described above in connection with reference number 540).

In some aspects, the UE 305-1 may re-perform a CSI process (e.g., similarly as described above in connection with reference number 510) with the UE 305-2 based at least in part on the grant of the additional resource. For example, the UE 305-1 may re-perform the CSI process with the UE 305-2 using the additional resource on the sidelink channel. Accordingly, the UE 305-2 may transmit, and the UE 305-1 may receive, a new indicator of a new state of the sidelink channel based at least in part on re-performing the CSI process. Additionally, the UE 305-1 may transmit the information to the UE 305-2 on the sidelink channel based at least in part on determining, using the new indicator, that the additional resource for the sidelink channel does permit sidelink communications with reliability that satisfies a threshold (e.g., similar to the determination described above in connection with reference number 515).

By using the techniques described above in connection with FIG. 5, the UE 305-1 may conserve resources by refraining from transmitting information to the UE 305-2 that is unlikely to be received and/or successfully decoded by the UE 305-2. Additionally, in some aspects, the UE 305-1 may reduce latency when the UE 305-1 transmits a request, for an additional resource for the sidelink channel, after determining a discrepancy between a current resource on the sidelink channel and an indicator of a state of the sidelink channel but also before a scheduled PUCCH slot with the base station 110.

As indicated above, FIG. 5 is provided as an example. Other examples may differ from what is described with respect to FIG. 5.

Figure 6:
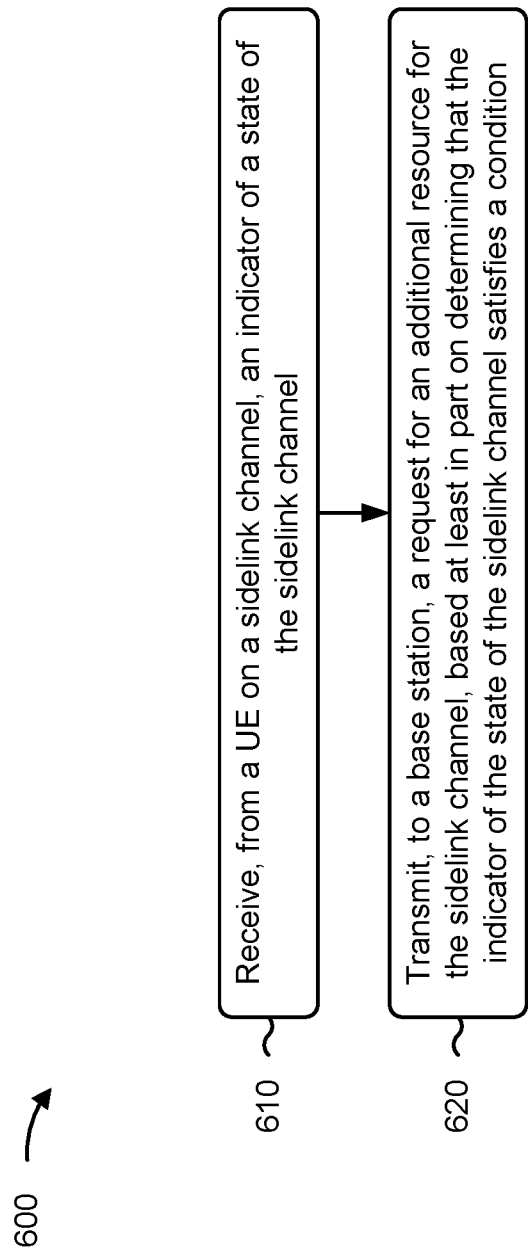
FIG. 6 is a diagram illustrating an example process performed by a UE, in accordance with the present disclosure.

FIG. 6 is a diagram illustrating an example process 600 performed, for example, by a first UE, in accordance with the present disclosure. Example process 600 is an example where the first UE (e.g., UE 120a and/or UE 305-1) performs operations associated with transmitting fast feedback for a sidelink channel.

As shown in FIG. 6, in some aspects, process 600 may include receiving, from a second UE (e.g., UE 120e and/or UE 305-2) on a sidelink channel, an indicator of a state of the sidelink channel (block 610). For example, the first UE (e.g., using one or more of antenna 252, demodulator 254, MIMO detector 256, receive processor 258, controller/processor 280, and/or memory 282) may receive, from the second UE on the sidelink channel, the indicator of the state of the sidelink channel, as described above.

As further shown in FIG. 6, in some aspects, process 600 may include transmitting, to a base station (e.g., base station 110), a request for an additional resource for the sidelink channel (block 620). For example, the first UE (e.g., using one or more of antenna 252, transmit processor 264, TX MIMO processor 266, modulator 254, controller/processor 280, and/or memory 282) may transmit, to the base station, the request for an additional resource for the sidelink channel, as described above. In some aspects, the request is based at least in part on determining (e.g., using one or more of MIMO detector 256, receive processor 258, transmit processor 264, TX MIMO processor 266, controller/processor 280, and/or memory 282) that the indicator of the state of the sidelink channel satisfies a condition.

Process 600 may include additional aspects, such as any single aspect or any combination of aspects described below and/or in connection with one or more other processes described elsewhere herein.

In a first aspect, the indicator of the state of the sidelink channel includes a CSI report.

In a second aspect, alone or in combination with the first aspect, process 600 further includes transmitting (e.g., using one or more of antenna 252, transmit processor 264, TX MIMO processor 266, modulator 254, controller/processor 280, and/or memory 282), to the base station, the indicator of the state of the sidelink channel.

In a third aspect, alone or in combination with one or more of the first and second aspects, the indicator of the state of the sidelink channel is transmitted on a PUCCH, a PUSCH, or a combination thereof.

In a fourth aspect, alone or in combination with one or more of the first through third aspects, process 600 further includes receiving (e.g., using one or more of antenna 252, demodulator 254, MIMO detector 256, receive processor 258, transmit processor 264, controller/processor 280, and/or memory 282), from the base station, an uplink grant based at least in part on transmitting the request for the additional resource, where the indicator of the state of the sidelink channel is transmitted using the uplink grant.

In a fifth aspect, alone or in combination with one or more of the first through fourth aspects, process 600 further includes receiving (e.g., using one or more of antenna 252, demodulator 254, MIMO detector 256, receive processor 258, transmit processor 264, controller/processor 280, and/or memory 282), from the base station, a grant of the additional resource based at least in part on the indicator of the state of the sidelink channel.

In a sixth aspect, alone or in combination with one or more of the first through fifth aspects, the grant includes an RRC message.

In a seventh aspect, alone or in combination with one or more of the first through sixth aspects, process 600 further includes receiving (e.g., using one or more of antenna 252, demodulator 254, MIMO detector 256, receive processor 258, transmit processor 264, controller/processor 280, and/or memory 282), from the base station, DCI for the sidelink channel.

In an eighth aspect, alone or in combination with one or more of the first through seventh aspects, process 600 further includes receiving (e.g., using one or more of antenna 252, demodulator 254, MIMO detector 256, receive processor 258, transmit processor 264, controller/processor 280, and/or memory 282) information intended for the second UE and scheduled by the DCI, and refraining from transmitting (e.g., using one or more of antenna 252, transmit processor 264, TX MIMO processor 266, modulator 254, controller/processor 280, and/or memory 282) the information to the second UE based at least in part on determining that the indicator of the state of the sidelink channel satisfies the condition.

In a ninth aspect, alone or in combination with one or more of the first through eighth aspects, the request for an additional resource for the sidelink channel includes a NACK signal.

In a tenth aspect, alone or in combination with one or more of the first through ninth aspects, process 600 further includes transmitting (e.g., using one or more of antenna 252, transmit processor 264, TX MIMO processor 266, modulator 254, controller/processor 280, and/or memory 282), to the base station and with the NACK signal, an SR for transmitting the indicator of the state of the sidelink channel.

In an eleventh aspect, alone or in combination with one or more of the first through tenth aspects, the NACK signal is transmitted on a PUCCH.

In a twelfth aspect, alone or in combination with one or more of the first through eleventh aspects, determining that the indicator of the state of the sidelink channel satisfies the condition includes determining (e.g., using one or more of MIMO detector 256, receive processor 258, transmit processor 264, TX MIMO processor 266, controller/processor 280, and/or memory 282) that a current resource for the sidelink channel does not permit sidelink communications with reliability that satisfies a threshold.

In a thirteenth aspect, alone or in combination with one or more of the first through twelfth aspects, the current resource is determined not to permit sidelink communications with reliability that satisfies the threshold when an MCS supported by the current resource is outside a range of MCSs granted by the base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
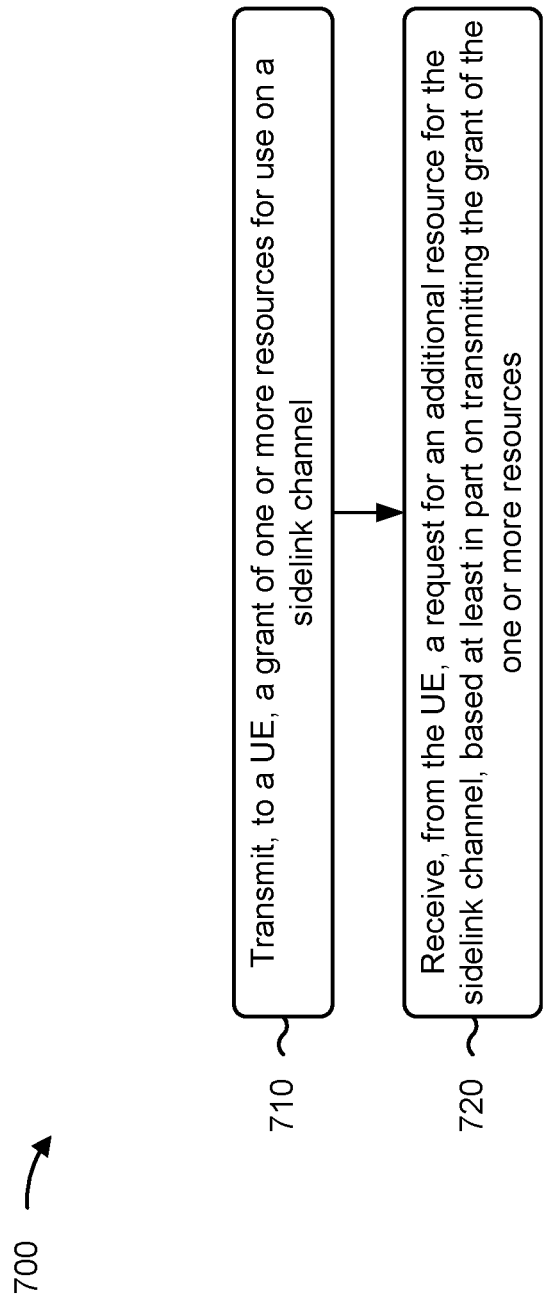
FIG. 7 is a diagram illustrating an example process performed by a base station, in accordance with the present disclosure.

FIG. 7 is a diagram illustrating an example process 700 performed, for example, by a base station, in accordance with various aspects of the present disclosure. Example process 700 is an example where the base station (e.g., base station 110) performs operations associated with receiving fast feedback for a sidelink channel.

As shown in FIG. 7, in some aspects, process 700 may include transmitting, to a UE (e.g., UE 120a and/or UE 305-1), a grant of one or more resources for use on a sidelink channel (block 710). For example, the base station (e.g., using one or more of transmit processor 220, TX MIMO processor 230, modulator 232, antenna 234, controller/processor 240, memory 242, and/or scheduler 246) may transmit, to the UE, the grant of the one or more resources for use on the sidelink channel, as described above.

As further shown in FIG. 7, in some aspects, process 700 may include receiving, from the UE, a request for an additional resource for the sidelink channel (block 720). For example, the base station (e.g., using one or more of antenna 234, demodulator 232, MIMO detector 236, receive processor 238, controller/processor 240, memory 242, or scheduler 246) may receive, from the UE, the request for an additional resource for the sidelink channel, as described above. In some aspects, the request is received based at least in part on transmitting the grant of the one or more resources.

Process 700 may include additional aspects, such as any single aspect or any combination of aspects described below and/or in connection with one or more other processes described elsewhere herein.

In a first aspect, process 700 further includes receiving (e.g., using one or more of antenna 234, demodulator 232, MIMO detector 236, receive processor 238, controller/processor 240, memory 242, or scheduler 246), from the UE, an indicator of a state of the sidelink channel.

In a second aspect, alone or in combination with the first aspect, the indicator of the state of the sidelink channel is received on a PUCCH, a PUSCH, or a combination thereof.

In a third aspect, alone or in combination with one or more of the first and second aspects, the indicator of the state of the sidelink channel includes a CSI report.

In a fourth aspect, alone or in combination with one or more of the first through third aspects, process 700 further includes transmitting (e.g., using one or more of transmit processor 220, TX MIMO processor 230, modulator 232, antenna 234, controller/processor 240, memory 242, and/or scheduler 246), to the UE, an uplink grant based at least in part on receiving the request for the additional resource, where the indicator of the state of the sidelink channel is received using the uplink grant.

In a fifth aspect, alone or in combination with one or more of the first through fourth aspects, process 700 further includes transmitting (e.g., using one or more of transmit processor 220, TX MIMO processor 230, modulator 232, antenna 234, controller/processor 240, memory 242, and/or scheduler 246), to the UE, a grant of the additional resource based at least in part on the indicator of the state of the sidelink channel.

In a sixth aspect, alone or in combination with one or more of the first through fifth aspects, the grant includes an RRC message.

In a seventh aspect, alone or in combination with one or more of the first through sixth aspects, the grant of the additional resource is transmitted based at least in part on determining (e.g., using one or more of transmit processor 220, TX MIMO processor 230, MIMO detector 236, receive processor 238, controller/processor 240, and/or memory 242) that the indicator of the state of the sidelink channel satisfies a condition.

In an eighth aspect, alone or in combination with one or more of the first through seventh aspects, determining that the indicator of the state of the sidelink channel satisfies the condition includes determining (e.g., using one or more of transmit processor 220, TX MIMO processor 230, MIMO detector 236, receive processor 238, controller/processor 240, and/or memory 242) that the one or more resources for use on the sidelink channel do not permit sidelink communications with reliability that satisfies a threshold.

In a ninth aspect, alone or in combination with one or more of the first through eighth aspects, the one or more resources are determined not to permit sidelink communications with reliability that satisfies the threshold when an MCS supported by the one or more resources is outside a range of MCSs indicated by the grant of the one or more resources.

In a tenth aspect, alone or in combination with one or more of the first through ninth aspects, process 700 further includes transmitting (e.g., using one or more of transmit processor 220, TX MIMO processor 230, modulator 232, antenna 234, controller/processor 240, memory 242, and/or scheduler 246), to the UE, DCI for the sidelink channel.

In an eleventh aspect, alone or in combination with one or more of the first through tenth aspects, process 700 further includes transmitting (e.g., using one or more of transmit processor 220, TX MIMO processor 230, modulator 232, antenna 234, controller/processor 240, memory 242, and/or scheduler 246), to the UE, information intended for a second UE on the sidelink channel and scheduled by the DCI, where the request for an additional resource is received based at least in part on transmitting the information intended for the second UE.

In a twelfth aspect, alone or in combination with one or more of the first through eleventh aspects, the request for an additional resource for the sidelink channel includes a NACK signal.

In a thirteenth aspect, alone or in combination with one or more of the first through twelfth aspects, process 700 further includes receiving (e.g., using one or more of antenna 234, demodulator 232, MIMO detector 236, receive processor 238, controller/processor 240, memory 242, or scheduler 246), from the UE and with the NACK signal, an SR for transmitting an indicator of a state of the sidelink channel.

In a fourteenth aspect, alone or in combination with one or more of the first through thirteenth aspects, the NACK signal is received on a PUCCH.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a first user equipment (UE), comprising: receiving, from a second UE on a sidelink channel, an indicator of a state of the sidelink channel; and transmitting, to a base station, a request for an additional resource for the sidelink channel, based at least in part on determining that the indicator of the state of the sidelink channel satisfies a condition.

Aspect 2: The method of Aspect 1, wherein the indicator of the state of the sidelink channel includes a channel state indicator report.

Aspect 3: The method of any of Aspects 1 through 2, further comprising: transmitting, to the base station, the indicator of the state of the sidelink channel.

Aspect 4: The method of Aspect 3, wherein the indicator of the state of the sidelink channel is transmitted on a physical uplink control channel, a physical uplink shared channel, or a combination thereof.

Aspect 5: The method of any of Aspects 3 through 4, further comprising: receiving, from the base station, an uplink grant based at least in part on transmitting the request for the additional resource, wherein the indicator of the state of the sidelink channel is transmitted using the uplink grant.

Aspect 6: The method of any of Aspects 3 through 5, further comprising: receiving, from the base station, a grant of the additional resource based at least in part on the indicator of the state of the sidelink channel.

Aspect 7: The method of Aspect 6, wherein the grant includes a radio resource configuration message.

Aspect 8: The method of any of Aspects 1 through 7, further comprising: receiving, from the base station, downlink control information (DCI) for the sidelink channel.

Aspect 9: The method of Aspect 8, further comprising: receiving information intended for the second UE and scheduled by the DCI; and refraining from transmitting the information to the second UE based at least in part on determining that the indicator of the state of the sidelink channel satisfies the condition.

Aspect 10: The method of any of Aspects 1 through 9, wherein the request for an additional resource for the sidelink channel includes a negative-acknowledgement (NACK) signal.

Aspect 11: The method of Aspect 10, further comprising: transmitting, to the base station and with the NACK signal, a scheduling request for transmitting the indicator of the state of the sidelink channel.

Aspect 12: The method of any of Aspects 10 through 11, wherein the NACK signal is transmitted on a physical uplink control channel.

Aspect 13: The method of any of Aspects 1 through 12, wherein determining that the indicator of the state of the sidelink channel satisfies the condition comprises determining that a current resource for the sidelink channel does not permit sidelink communications with reliability that satisfies a threshold.

Aspect 14: The method of Aspect 13, wherein the current resource is determined not to permit sidelink communications with reliability that satisfies the threshold when a modulation and coding scheme (MCS) supported by the current resource is outside a range of MCSs granted by the base station.

Aspect 15: A method of wireless communication performed by a base station, comprising: transmitting, to a UE, a grant of one or more resources for use on a sidelink channel; and receiving, from the UE, a request for an additional resource for the sidelink channel, based at least in part on transmitting the grant of the one or more resources.

Aspect 16: The method of Aspect 15, further comprising: receiving, from the UE, an indicator of a state of the sidelink channel.

Aspect 17: The method of Aspect 16, wherein the indicator of the state of the sidelink channel is received on a physical uplink control channel, a physical uplink shared channel, or a combination thereof.

Aspect 18: The method of any of Aspects 16 through 17, wherein the indicator of the state of the sidelink channel includes a channel state indicator report.

Aspect 19: The method of any of Aspects 16 through 18, further comprising: transmitting, to the UE, an uplink grant based at least in part on receiving the request for the additional resource, wherein the indicator of the state of the sidelink channel is received using the uplink grant.

Aspect 20: The method of any of Aspects 16 through 18, further comprising: transmitting, to the UE, a grant of the additional resource based at least in part on the indicator of the state of the sidelink channel.

Aspect 21: The method of Aspect 20, wherein the grant includes a radio resource configuration message.

Aspect 22: The method of any of Aspects 20 through 21, wherein the grant of the additional resource is transmitted based at least in part on determining that the indicator of the state of the sidelink channel satisfies a condition.

Aspect 23: The method of Aspect 22, wherein determining that the indicator of the state of the sidelink channel satisfies the condition comprises determining that the one or more resources for use on the sidelink channel do not permit sidelink communications with reliability that satisfies a threshold.

Aspect 24: The method of Aspect 23, wherein the one or more resources are determined not to permit sidelink communications with reliability that satisfies the threshold when a modulation and coding scheme (MCS) supported by the one or more resources is outside a range of MCSs indicated by the grant of the one or more resources.

Aspect 25: The method of any of Aspects 15 through 24, further comprising: transmitting, to the UE, downlink control information (DCI) for the sidelink channel.

Aspect 26: The method of Aspect 25, further comprising transmitting, to the UE, information intended for a second UE on the sidelink channel and scheduled by the DCI, wherein the request for an additional resource is received based at least in part on transmitting the information intended for the second UE.

Aspect 27: The method of any of Aspects 15 through 26, wherein the request for an additional resource for the sidelink channel includes a negative-acknowledgement (NACK) signal.

Aspect 28: The method of Aspect 27, further comprising: receiving, from the UE and with the NACK signal, a scheduling request for transmitting an indicator of a state of the sidelink channel.

Aspect 29: The method of any of Aspects 27 through 28, wherein the NACK signal is received on a physical uplink control channel.

Aspect 30: An apparatus for wireless communication at a device, comprising a processor; memory coupled with the processor; and instructions stored in the memory and executable by the processor to cause the apparatus to perform the method of one or more Aspects of Aspects 1-14.

Aspect 31: A device for wireless communication, comprising a memory and one or more processors coupled to the memory, the memory and the one or more processors configured to perform the method of one or more Aspects of Aspects 1-14.

Aspect 32: An apparatus for wireless communication, comprising at least one means for performing the method of one or more Aspects of Aspects 1-14.

Aspect 33: A non-transitory computer-readable medium storing code for wireless communication, the code comprising instructions executable by a processor to perform the method of one or more Aspects of Aspects 1-14.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 35: An apparatus for wireless communication at a device, comprising a processor; memory coupled with the processor; and instructions stored in the memory and executable by the processor to cause the apparatus to perform the method of one or more Aspects of Aspects 15-29.

Aspect 36: A device for wireless communication, comprising a memory and one or more processors coupled to the memory, the memory and the one or more processors configured to perform the method of one or more Aspects of Aspects 15-29.

Aspect 37: An apparatus for wireless communication, comprising at least one means for performing the method of one or more Aspects of Aspects 15-29.

Aspect 38: A non-transitory computer-readable medium storing code for wireless communication, the code comprising instructions executable by a processor to perform the method of one or more Aspects of Aspects 15-29.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 15-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors coupled to the memory, the one or more processors configured to:
receive, from a network entity, a sidelink grant of one or more resources for use on a sidelink channel;
receive, from a second UE on the sidelink channel, an indicator of a state of the sidelink channel associated with the sidelink grant; and
transmit, to the network entity, a request for an additional resource for the sidelink channel, based at least in part on determining that the indicator of the state of the sidelink channel satisfies a condition, the indicator of the state of the sidelink channel satisfying the condition based at least in part on a modulation and coding scheme (MCS) supported by a current resource for the sidelink channel being outside a range of MCSs granted by the network entity.

2. The first UE of claim 1, wherein the indicator of the state of the sidelink channel includes a channel state indicator report.

3. The first UE of claim 1, wherein the one or more processors are further configured to:
transmit, to the network entity, the indicator of the state of the sidelink channel.

4. The first UE of claim 3, wherein the indicator of the state of the sidelink channel is transmitted on a physical uplink control channel, a physical uplink shared channel, or a combination thereof.

5. The first UE of claim 3, wherein the one or more processors are further configured to:
receive, from the network entity, an uplink grant based at least in part on transmitting the request for the additional resource,
wherein the indicator of the state of the sidelink channel is transmitted using the uplink grant.

6. The first UE of claim 3, wherein the one or more processors are further configured to:
receive, from the network entity, a sidelink grant of the additional resource based at least in part on the indicator of the state of the sidelink channel.

7. The first UE of claim 6, wherein the sidelink grant for the one or more resources includes a radio resource configuration message.

8. The first UE of claim 1, further comprising:
receiving, from the network entity, downlink control information (DCI) for the sidelink channel.

9. The first UE of claim 8, wherein the one or more processors are further configured to:
receive information intended for the second UE and scheduled by the DCI; and
refrain from transmitting the information to the second UE based at least in part on determining that the indicator of the state of the sidelink channel satisfies the condition.

10. The first UE of claim 1, wherein the request for an additional resource for the sidelink channel includes a negative-acknowledgement (NACK) signal.

11. The first UE of claim 10, wherein the one or more processors are further configured to:
transmit, to the network entity and with the NACK signal, a scheduling request for transmitting the indicator of the state of the sidelink channel.

12. The first UE of claim 10, wherein the NACK signal is transmitted on a physical uplink control channel.

13. The first UE of claim 1, wherein determining that the indicator of the state of the sidelink channel satisfies the condition comprises determining that the current resource for the sidelink channel does not permit sidelink communications with reliability that satisfies a threshold.

14. The first UE of claim 13, wherein the current resource is determined not to permit sidelink communications with reliability that satisfies the threshold when the MCS supported by the current resource is outside the range of MCSs, the range of MCSs indicated by the sidelink grant of the one or more resources.

15. A network entity for wireless communication, comprising:
a memory; and
one or more processors coupled to the memory, the one or more processors configured to:
transmit, to a user equipment (UE), a sidelink grant of one or more resources for use on a sidelink channel, the sidelink grant indicating a range of modulation and coding schemes (MCSs);
receive, from the UE, a request for an additional resource for the sidelink channel, based at least in part on a MCS supported by the one or more resources being outside the range of MCSs; and
transmit a sidelink grant of the additional resource for the sidelink channel.

16. A method of wireless communication performed by a first user equipment (UE), comprising:
receiving, from a network entity, a sidelink grant of one or more resources for use on a sidelink channel;
receiving, from a second UE on the sidelink channel, an indicator of a state of the sidelink channel associated with the sidelink grant; and
transmitting, to the network entity, a request for an additional resource for the sidelink channel, based at least in part on determining that the indicator of the state of the sidelink channel satisfies a condition, the indicator of the state of the sidelink channel satisfying the condition based at least in part on a modulation and coding scheme (MCS) supported by a current resource for the sidelink channel being outside a range of MCSs granted by the network entity.

17. The method of claim 16, wherein the indicator of the state of the sidelink channel includes a channel state indicator report.

18. The method of claim 16, further comprising:
transmitting, to the network entity, the indicator of the state of the sidelink channel.

19. The method of claim 18, wherein the indicator of the state of the sidelink channel is transmitted on a physical uplink control channel, a physical uplink shared channel, or a combination thereof.

20. The method of claim 18, further comprising:
receiving, from the network entity, an uplink grant based at least in part on transmitting the request for the additional resource,
wherein the indicator of the state of the sidelink channel is transmitted using the uplink grant.

21. The method of claim 18, further comprising:
receiving, from the network entity, a sidelink grant of the additional resource based at least in part on the indicator of the state of the sidelink channel.

22. The method of claim 21, wherein the sidelink grant for the one or more resources includes a radio resource configuration message.

23. The method of claim 16, further comprising:
receiving, from the network entity, downlink control information (DCI) for the sidelink channel.

24. The method of claim 23, further comprising:
receiving information intended for the second UE and scheduled by the DCI; and
refraining from transmitting the information to the second UE based at least in part on determining that the indicator of the state of the sidelink channel satisfies the condition.

25. The method of claim 16, wherein the request for an additional resource for the sidelink channel includes a negative-acknowledgement (NACK) signal.

26. The method of claim 25, further comprising:
transmitting, to the network entity and with the NACK signal, a scheduling request for transmitting the indicator of the state of the sidelink channel.

27. The method of claim 25, wherein the NACK signal is transmitted on a physical uplink control channel.

28. The method of claim 16, wherein determining that the indicator of the state of the sidelink channel satisfies the condition comprises determining that the current resource for the sidelink channel does not permit sidelink communications with reliability that satisfies a threshold.

29. The method of claim 28, wherein the current resource is determined not to permit sidelink communications with reliability that satisfies the threshold when the MCS supported by the current resource is outside the range of MCSs, the range of MCSs indicated by the sidelink grant of the one or more resources.

30. A method of wireless communication performed by a network entity, comprising:
transmitting, to a user equipment (UE), a sidelink grant of one or more resources for use on a sidelink channel, the sidelink grant indicating a range of modulation and coding schemes (MCSs);
receiving, from the UE, a request for an additional resource for the sidelink channel, based at least in part on a MCS supported by the one or more resources being outside the range of MCSs; and
transmitting a sidelink grant of the additional resource for the sidelink channel.

* * * * *